(12) United States Patent
Bremmer et al.

(10) Patent No.: US 10,247,273 B2
(45) Date of Patent: Apr. 2, 2019

(54) COMPOSITE OVER WRAP

(71) Applicant: Sikorsky Aircraft Corporation, Stratford, CT (US)

(72) Inventors: Jonathan Bremmer, Kennesaw, GA (US); Jeffrey G. Sauer, Woodbury, CT (US); Robert A. Lacko, Oxford, CT (US); Shihong G. Song, Cheshire, CT (US); John H. Meeson, Jr., Trumbull, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 169 days.

(21) Appl. No.: 15/180,334

(22) Filed: Jun. 13, 2016

(65) Prior Publication Data
US 2017/0058990 A1 Mar. 2, 2017

Related U.S. Application Data

(60) Provisional application No. 62/211,493, filed on Aug. 28, 2015.

(51) Int. Cl.
| | |
|---|---|
| *F16C 3/00* | (2006.01) |
| *F16F 15/12* | (2006.01) |
| *B32B 5/12* | (2006.01) |
| *B32B 27/38* | (2006.01) |
| *B32B 27/34* | (2006.01) |
| *B32B 25/08* | (2006.01) |

(Continued)

(52) U.S. Cl.
CPC ............ *F16F 15/1201* (2013.01); *B32B 1/08* (2013.01); *B32B 5/02* (2013.01); *B32B 5/12* (2013.01); *B32B 5/26* (2013.01); *B32B 7/06* (2013.01); *B32B 25/08* (2013.01); *B32B 25/10* (2013.01); *B32B 27/12* (2013.01); *B32B 27/34* (2013.01); *B32B 27/38* (2013.01); *B64C 27/001* (2013.01); *B64C 27/14* (2013.01); *F16C 3/023* (2013.01); *F16C 3/026* (2013.01); *B32B 2255/00* (2013.01); *B32B 2260/021* (2013.01); *B32B 2260/046* (2013.01); *B32B 2262/0269* (2013.01); *B32B 2262/101* (2013.01); *B32B 2262/106* (2013.01); *B32B 2307/56* (2013.01); *B32B 2307/748* (2013.01); *B32B 2597/00* (2013.01); *B32B 2605/18* (2013.01); *Y10T 464/50* (2015.01)

(58) Field of Classification Search
CPC ....... B64C 27/001; F16C 3/026; Y10T 464/50
USPC ........................................... 464/181; 244/60
See application file for complete search history.

(56) References Cited

U.S. PATENT DOCUMENTS 3,779,451 A 12/1973 Lehman
4,089,190 A * 5/1978 Worgan .................. F16C 3/026
464/181 X
(Continued)

*Primary Examiner* — Greg Binda
(74) *Attorney, Agent, or Firm* — Cantor Colburn LLP

(57) ABSTRACT

A composite wrap is provided for damping vibration in an elongated quill shaft having a cylindrical body. The composite wrap includes interior layering for disposition about a cylindrical body, exterior layering configured to define an exterior composite wrap shape and sequential cured-in-place, vibration damping, fibrous epoxy layers. The sequential cured-in-place, vibration damping, fibrous epoxy layers are radially interposed between the interior and exterior layering to dampen vibrations of and/or to adjust a resonance frequency of the cylindrical body.

15 Claims, 5 Drawing Sheets

(51) Int. Cl.
  *F16C 3/02*     (2006.01)
  *B64C 27/00*    (2006.01)
  *B64C 27/14*    (2006.01)
  *B32B 5/02*     (2006.01)
  *B32B 5/26*     (2006.01)
  *B32B 7/06*     (2019.01)
  *B32B 25/10*    (2006.01)
  *B32B 27/12*    (2006.01)
  *B32B 1/08*     (2006.01)

(56) References Cited

U.S. PATENT DOCUMENTS

| | | |
|---|---|---|
| 4,411,637 A | 10/1983 | Ranch |
| 4,809,606 A | 3/1989 | Day et al. |
| 5,149,013 A | 9/1992 | Costanzo et al. |
| 5,342,464 A | 8/1994 | McIntire et al. |
| 5,431,538 A | 7/1995 | Schamaling et al. |
| 5,435,868 A | 7/1995 | Yu et al. |
| 6,234,912 B1 * | 5/2001 | Koschier ............... F16C 3/026 |
| 6,336,986 B1 * | 1/2002 | Lee ....................... B29C 70/088 |
| | | 464/181 X |
| 2015/0060594 A1 | 3/2015 | Nguyen et al. |

* cited by examiner

COMPOSITE OVER WRAP

CROSS-REFERENCE TO RELATED APPLICATION

This is a non-provisional application that claims the benefit of priority to provisional application No. 62/211,493, which was filed on Aug. 28, 2015. The entire contents of provisional application No. 62/211,493 are incorporated herein by reference.

FEDERAL RESEARCH STATEMENT

This invention was made with government support with the United States Navy under Contract No.: N00019-06-C-0081. The government therefore has certain rights in this invention.

BACKGROUND OF THE DISCLOSURE

The subject matter disclosed herein relates to a composite over wrap and, more particularly, to a composite over wrap that is to be provided on a shaft for frequency control.

Aircraft drive systems, such as those in aircraft used to drive aircraft rotors, utilize rotating drive shafts for power transfer and other uses. Such systems may include a plurality of quill shafts that are generally used to align complementary gearing, such as generator gearing and an engine gearing. A quill shaft is typically configured as a long, thin, hardened steel shaft with splines on one or both ends. One of these ends may thus be disposed to supportively spline into a gear of the engine and the other end may be disposed to supportively spline into or connect with a gear of the generator.

During operational conditions, excitations loads are applied to the quill shaft(s) by the various aircraft drive systems and it has been seen that dynamic natural frequency responses on certain engineered quill shafts contributed to early shaft failures. Indeed, conventional quill shafts were often unable to match needed frequency resistance without heavyweight alternative designs.

BRIEF DESCRIPTION OF THE DISCLOSURE

According to one aspect of the disclosure, a composite wrap is provided for damping vibration in an elongated quill shaft having a cylindrical body. The composite wrap includes interior layering for disposition about a cylindrical body, exterior layering configured to define an exterior composite wrap shape and sequential cured-in-place, vibration damping, fibrous epoxy layers. The sequential cured-in-place, vibration damping, fibrous epoxy layers are radially interposed between the interior and exterior layering to dampen vibrations of and/or to adjust a resonance frequency of the cylindrical body.

In accordance with additional or alternative embodiments, the interior layering includes at least one of a release coating and a rubber interface layer and the exterior layering includes a tape wrap layer of varying fiber orientations and a nylon bagging layer.

In accordance with additional or alternative embodiments, the sequential cured-in-place, vibration damping fibrous epoxy layers include layers of fibers suspended within epoxy matrixes.

In accordance with additional or alternative embodiments, the layers of the fibers include layers of woven or unidirectional graphite or fiberglass, Aramid™ or Kevlar™ fibers suspended within the epoxy matrixes with varying fiber orientations.

In accordance with additional or alternative embodiments, a first one of the layers of the fibers includes fibers having first degree fiber orientations, a second one of the layers of the fibers includes fibers having second degree fiber orientations and a third one of the layers of the fibers includes fibers having third degree fiber orientations. At least one of the first, second and third degree fiber orientations is unique from the others.

In accordance with additional or alternative embodiments, the third one of the layers of the fibers includes overwrap portions.

According to another aspect of the disclosure, a quill shaft is provided and includes an elongate shaft member having a central portion and first and second opposite longitudinal ends and a composite wrap. The composite wrap includes interior layering for disposition about the central portion, exterior layering configured to define an exterior composite wrap shape and sequential cured-in-place, vibration damping, fibrous epoxy layers radially interposed between the interior and exterior layering to dampen quill shaft vibrations and/or to adjust a quill shaft resonance frequency.

In accordance with additional or alternative embodiments, the elongate shaft member includes metallic material, the first longitudinal end includes a first cylindrical body having a larger diameter than the central portion, a first curved interface and a splined distal end and the second longitudinal end includes a second cylindrical body having a larger diameter than the central portion, a second curved interface and a distal end.

In accordance with additional or alternative embodiments, the composite wrap includes an interior surface to abut with an exterior surface of the central portion, curved axial surfaces to abut with respective exterior surfaces of the first and second curved interfaces and an exterior surface coplanar with respective planes of exterior surfaces of the first and second cylindrical bodies.

In accordance with additional or alternative embodiments, the interior layering includes at least one of a release coating and a rubber interface layer and the exterior layering includes a tape wrap layer of varying fiber orientations and a nylon bagging layer.

In accordance with additional or alternative embodiments, the sequential cured-in-place, vibration damping fibrous epoxy layers include layers of fibers suspended within epoxy matrixes.

In accordance with additional or alternative embodiments, the layers of the fibers include layers of woven or unidirectional graphite or fiberglass, Aramid™ or Kevlar™ fibers suspended within the epoxy matrixes with varying fiber orientations.

In accordance with additional or alternative embodiments, a first one of the layers of the fibers includes fibers having first degree fiber orientations, a second one of the layers of the fibers includes fibers having second degree fiber orientations and a third one of the layers of the fibers includes fibers having third degree fiber orientations. At least one of the first, second and third degree fiber orientations is unique from the others.

In accordance with additional or alternative embodiments, an aircraft is provided and includes a first gear and a second gear connected by a quill shaft that transmits torsional energy between the first and second gears.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION OF THE DISCLOSURE

As will be described below, an uncoupled/unbonded composite wrap has been provided for an axially loaded quill shaft or another similar device. The wrap is cured over a metallic (e.g., steel or any other similar material) surface of the quill shaft and has a light weight graphite epoxy layup structure with an optional rubber interface. This structure serves to dampen and thus mitigate vibrations to which the quill shaft may be subjected to during test loads over its service lifetime. As a general matter, the following description relates to any cylindrical or non-cylindrical shaft or shaft-like device in any application where resonant frequencies of the shaft or the shaft-like device are modified by a combination of overwraps of composites and other damping materials. The resonant frequencies would be modified for any number of reasons including, but not limited to, preventing excessive loading from resonant excitation, sound profile modification, preventing vibrations from traveling from one location to another along the device, etc.

Figure 1:
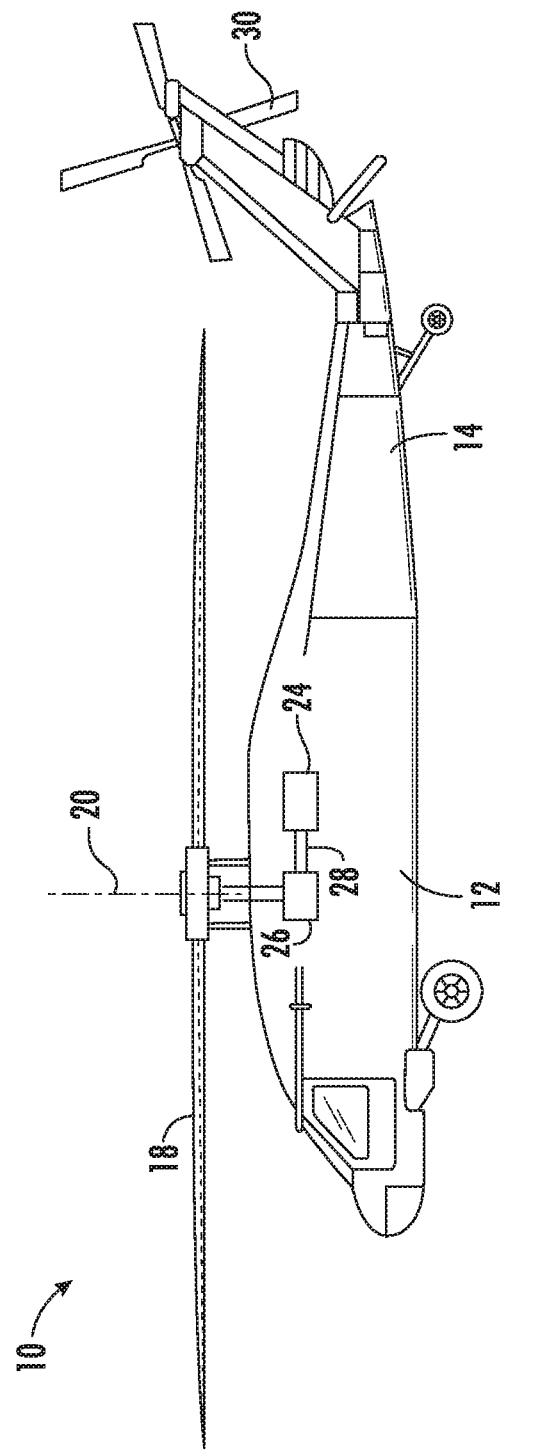
FIG. 1 is a side view of an aircraft in accordance with embodiments.
Figure 2:
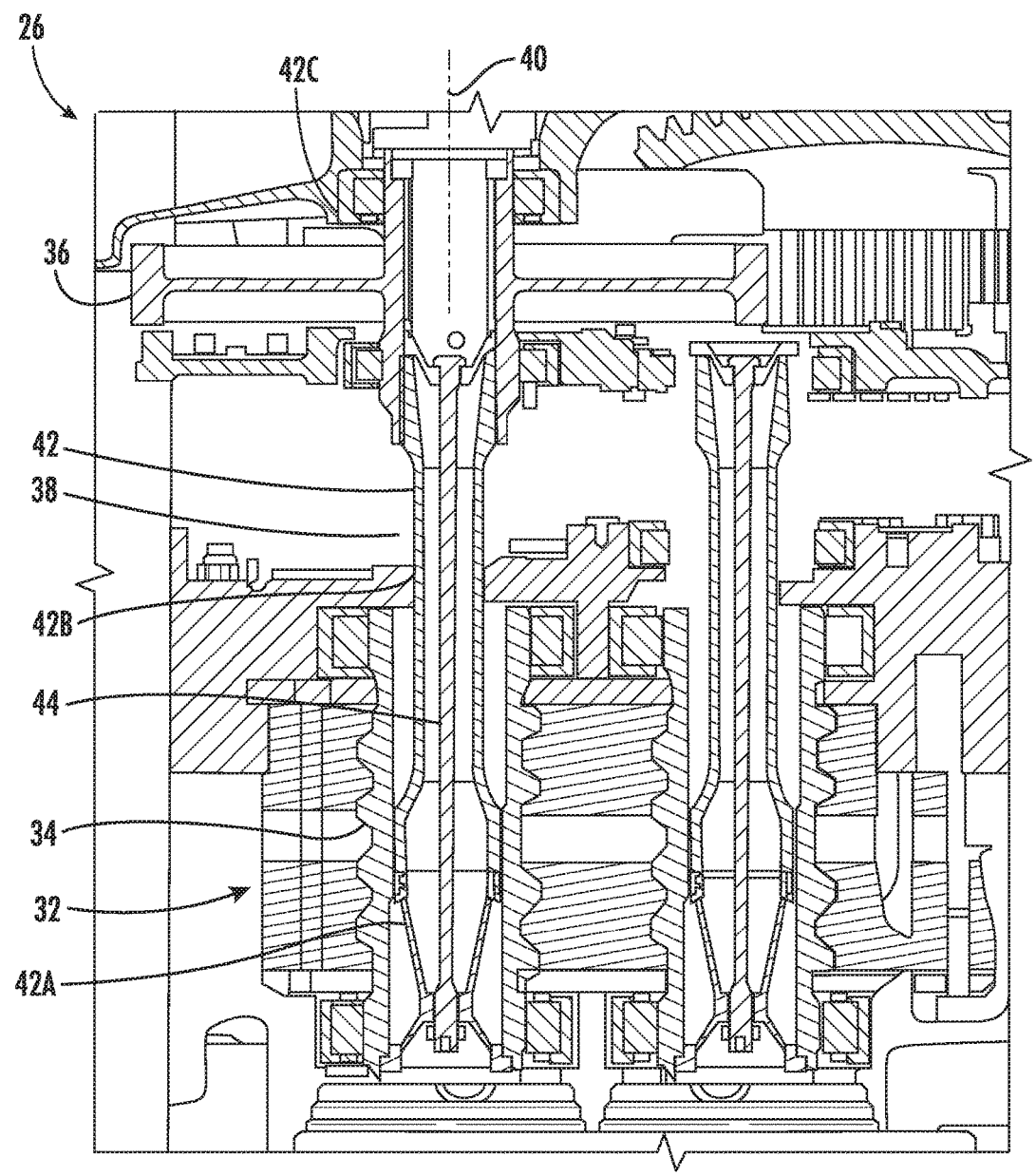
FIG. 2 is a partial cross section of a gear train of the aircraft of FIG. 1 utilizing a vibration damping device.

With reference to FIGS. 1 and 2, an aircraft such as a helicopter 10 is provided. The helicopter 10 includes an airframe 12 with an extending tail 14. A tail rotor assembly 16 is provided at the tail 14 and is drivable to rotate about a tail rotor axis 17. A main rotor assembly 18 is located at a top portion of the airframe 12 and is drivable to rotate about a main rotor axis 20. At least the main rotor assembly 18 is driven by a power system including a generator 24, an engine 26 and a drive shaft 27 by way of a gearbox 25 (see FIG. 2). The engine 26 provides drive energy for at least the main rotor assembly 18 and operations of the engine 26 may be supported or powered by the generator 24. The generator 24 is connected to the engine by way of the drive shaft 27.

At least the generator 24 and the engine 26 may be connected with a plurality (e.g., seven) quill shafts 28. The various quill shafts 28 serve to align complementary gearing, such as an output gear of the generator 24 and an input gear of the engine 26.

With reference to FIG. 2, a gear train 250 of the gearbox 25 is illustrated. The gear train 250 may include a first gear 251, a second gear 252 and an elongated quill assembly 253. The elongated quill assembly 253 may include a quill shaft 254 that is engaged to and extendable between first and second gears 251 and 252. The elongated quill assembly 253 is configured to rotate about an axis 255 along with the first and second gears 251 and 252. As shown in FIG. 2, the first and second gears 251 and 252 may be concentrically located to rotate about the axis 255 with the elongated quill assembly 253. However, it is to be understood that the invention is not limited to this configuration.

It is to be appreciated that while the quill shaft 28 disclosed herein is utilized to connect with the generator 24 and/or the engine 26 in order to align the complementary gearing, the quill shaft 28 may be utilized in other aircraft and ground assemblies as well. For example, the quill shaft 28 can be used to connect the engine 26 with respect to other features such as the gearbox 25 of FIG. 2 as part of the elongated quill assembly 253, a tail rotor assembly and a transmission system. Further, the quill shaft 28 may be utilized in other applications, such as in connecting gears used in coaxial rotary wing aircraft, fixed wing aircraft, automobiles, industrial machinery, ships or boats where power and torque are being transmitted. In any case, each quill shaft 28 is often subject to vibrations resulting from various operational conditions. When such vibrations approach or become equal with multiples of a resonance frequency of a given quill shaft 28 of a given material/length, the quill shaft 28 or other components of proximal systems are at increased risk of failures. As such, it may be advantageous to dampen quill shaft 28 vibrations.

Figure 3:
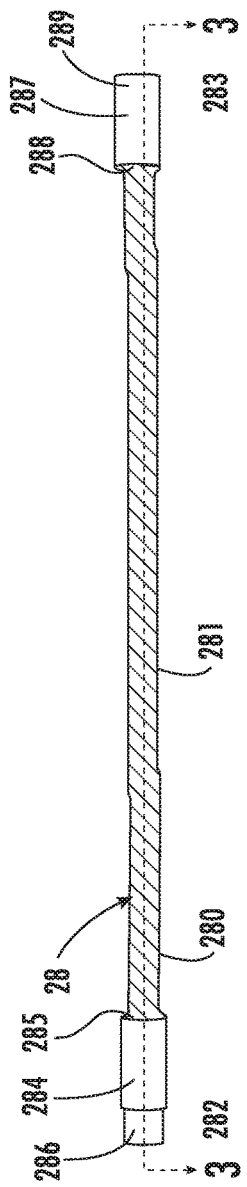
FIG. 3 is a side view of a quill shaft in accordance with embodiments.

With reference to FIG. 3, the quill shaft 28 is generally formed of metallic materials, such as steel or other similar materials. The quill shaft 28 includes an elongate shaft member 280 having a central portion 281, a first longitudinal end 282 and a second longitudinal end 283 disposed opposite the first longitudinal end 282. The first longitudinal end 282 has a first cylindrical body 284 that has a larger diameter than the central portion 281, a first curved interface 285 by which an exterior surface of the first cylindrical body 284 connects with an exterior surface of the central portion 281 and a splined distal end 286 that supportively connects with either the generator 24 or the engine 26. The second longitudinal end 283 has a second cylindrical body 287 that has a larger diameter than the central portion 281 (and possibly a similar diameter as the first cylindrical body 284), a second curved interface 288 by which an exterior surface of the second cylindrical body 287 connects with the exterior surface of the central portion 281 and a distal end 289 that be splined or un-splined and connects with the other of the generator 24 or the engine 26 so as to transmit torque between the generator 24 and the engine 26. While a particular quill shaft 28 is shown, it is understood that aspects of the invention are usable with other quill shaft configurations and that the quill shaft 28 could be usable to transmit torque between gears in other parts of the transmission.

The exterior surface of at least the central portion 281 is generally smooth and may be provided as a cylinder or as a cylindrical body. In accordance with embodiments, the central portion 281 is wrapped in a relatively light weight composite wrap 30 in order to damp quill shaft 28 vibrations during normal operational excitation loading thereof. As will be described herein, the composite wrap 30 includes elastomeric materials, fibers suspended therein with fiber orientations allowing for many optional resistance designs and, in some cases, a rubberized interface. The rubberized interface can serve to increase damping and can be added as a co-cure layer. In any case, the various materials of the composite wrap are configured to resist harsh environments, fluid pressures and fluid temperatures that may be present in an aircraft engine 26 or gearbox.

Figure 4A:
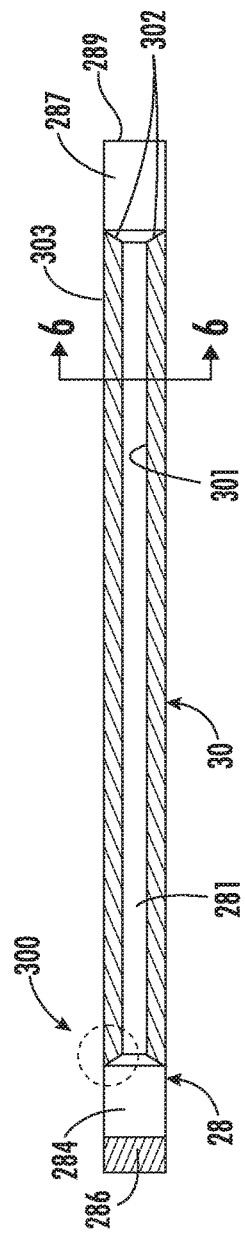
FIG. 4A is a side schematic view of the quill shaft of FIG. 3 taken along line 3-3 with a composite wrap in accordance with embodiments.
Figure 4B:
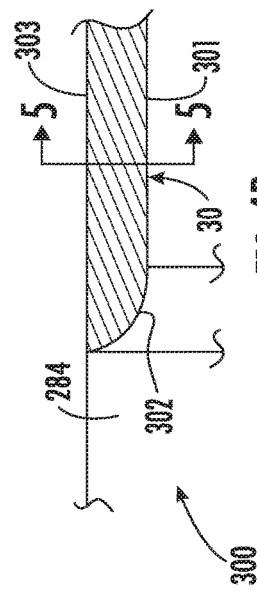
FIG. 4B is an enlarged view of the encircled portion of the composite wrap of FIG. 4A.

As shown in FIGS. 4A and 4B, the exterior surface of the central portion 281, respective planes of the exterior surfaces of the first and second cylindrical bodies 284 and 287 and respective exterior surfaces of the first and second curved interfaces 285 and 288 delimit a region 300 in which the composite wrap 30 is formable. Thus, the composite wrap 30 may have an interior surface 301 that abuts with the exterior surface of the central portion 281, curved axial surfaces 302 that abut with the respective exterior surfaces of the first and second curved interfaces 285 and 288 and an exterior surface 303 that runs along, within or slightly outside of the respective planes of the exterior surfaces of the first and second cylindrical bodies 284 and 287.

In accordance with embodiments, the exterior surface 303 may be parallel and coplanar with the respective planes of the exterior surfaces of the first and second cylindrical bodies 284 and 287, as shown in FIG. 4B. However, it is to be understood that in some cases the exterior surface 303 may not extend to the respective planes of the exterior surfaces of the first and second cylindrical bodies 284 and 287 if the composite wrap 30 can serve its damping purpose with a relatively small diameter. Alternatively, the exterior surface 303 may extend beyond the respective planes of the exterior surfaces of the first and second cylindrical bodies 284 and 287 if there is sufficient room around the quill shaft 28 and the composite wrap 30 needs additional diametric size in order to serve its damping purpose.

Figure 5:
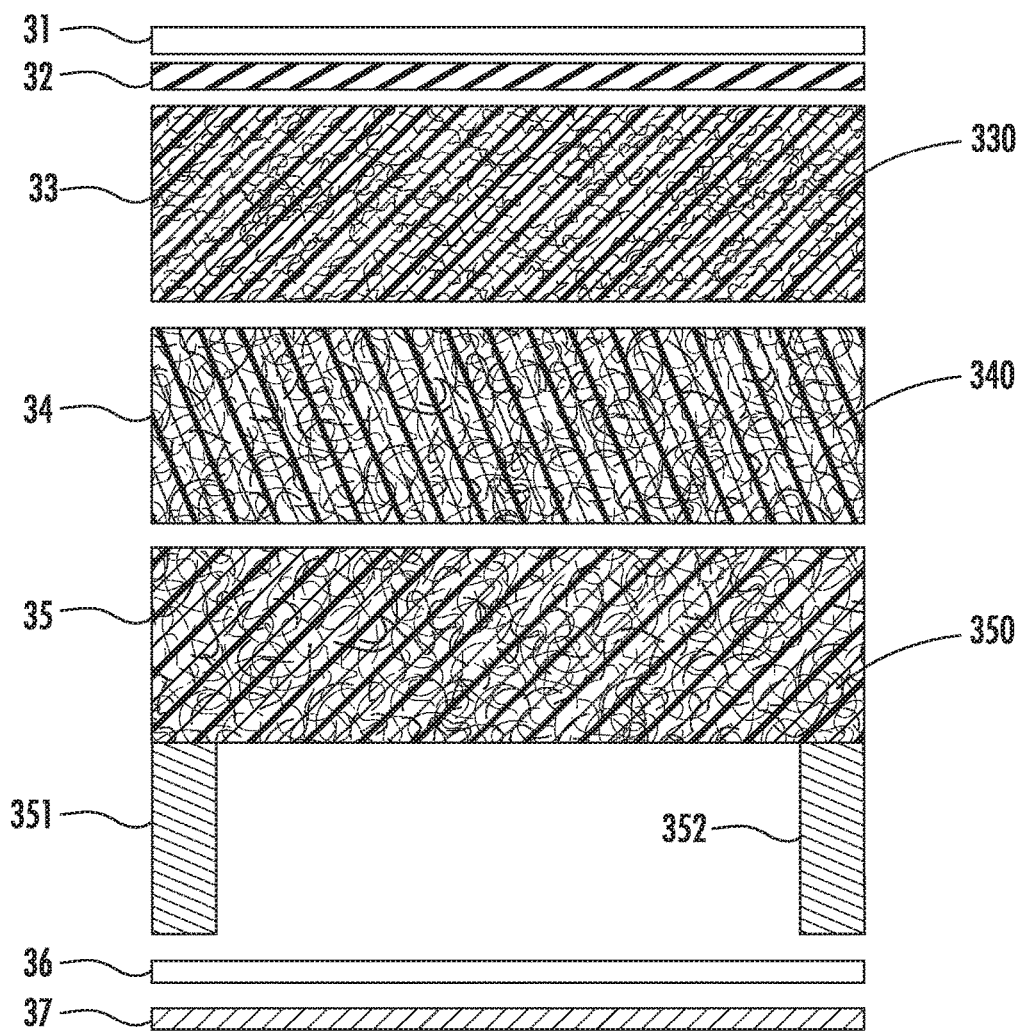
FIG. 5 is a cross-sectional view of the composite wrap of taken along line 5-5 of FIG. 4B in accordance with embodiments.
Figure 6:
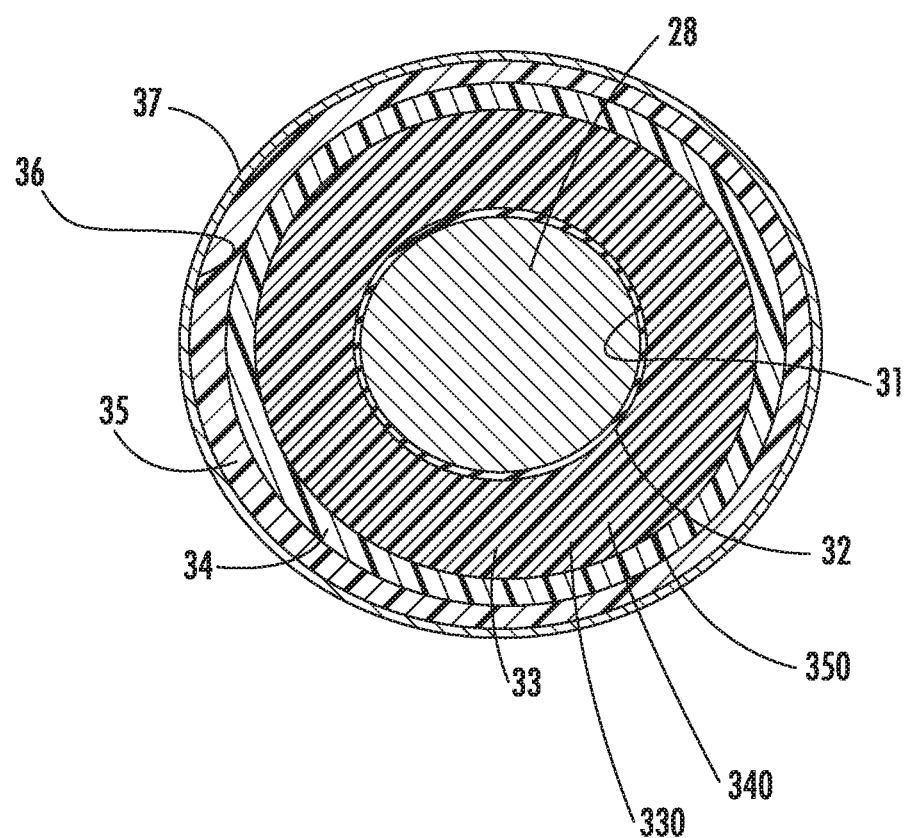
FIG. 6 is an axial view of the various layers of the composite wrap applied to the quill shaft, taken along line 6-6 of FIG. 4A in accordance with embodiments.

With reference to FIGS. 5 and 6, which are not drawn to scale, the composite wrap 30 may include interior layering (e.g., at least one or both of a release coating 31 and an optional rubber interface layer 32), first, second and third layers 33, 34 and 35 and exterior layering (e.g., a tape wrap layer 36 of varying fiber orientations and a nylon bagging layer 37). The release coating 31 of the interior layering abuts radially with the exterior surface of the central portion 281 and the optional rubber interface layer 32, when provided, extends about the release coating 31. In accordance with embodiments, the optional rubber interface 32, when provided, may be formed of an elastomeric or other resilient material for vibration damping.

The first, second and third layers 33, 34 and 35 extend sequentially about the optional rubber interface layer 32 and each other with the tape wrap layer 36 and the nylon bagging layer 37 of the exterior layering provided sequentially at an exterior of the composite wrap 30. The first, second and third layers 33, 34 and 35 are provided as sequential cured-in-place, vibration damping, fibrous epoxy layers. More particularly, the first, second and third layers 33, 34 and 35 may be provided as sequential layers of cured-in-place, vibration damping, fiber epoxy layups that are radially interposed between the interior and exterior layering to dampen vibrations of the quill shaft 28 and/or to adjust a resonance frequency of the quill shaft 28. Alternatively, the first, second and third layers 33, 34 and 35 may be provided as sequential layers of wound fibers that are radially interposed between the interior and exterior layering to dampen vibrations of the quill shaft 28 and/or to adjust a resonance frequency of the quill shaft 28.

For purposes of clarity and brevity, the following description will relate to the case where the first, second and third layers 33, 34 and 35 are provided as the sequential layers of cured-in-place, vibration damping, fiber epoxy layups. However, it is to be understood that this is merely exemplary and not intended to be limiting of the overall scope of this disclosure in any way.

In accordance with embodiments, the first, second and third layers 33, 34 and 35 may be formed of layers of woven or unidirectional graphite or fiberglass. Aramid™ or Kevlar™ fibers (or other similar materials or any combinations thereof) suspended within epoxy matrixes or matrixes of other similar materials and, in accordance with further embodiments may be provided with varying fiber orientations. That is, the first layer 33 may have fibers 330 aligned at a first fiber orientation degree with respect to a longitudinal axis of the quill shaft 28, the second layer 34 may have fibers 340 aligned at a second fiber orientation degree with respect to the longitudinal axis of the quill shaft 28 and the third layer 35 may have fibers 350 aligned at a third fiber orientation degree with respect to the longitudinal axis of the quill shaft 28. Of the first, second and third fiber orientation degrees, at least one or more may be unique with respect to the others.

As a further example, as shown in FIG. 5, the first layer 33 may have graphite or fiberglass fibers 330 aligned at 0° with respect to a longitudinal axis of the quill shaft 28, the second layer 34 may have graphite or fiberglass fibers 340 aligned at 45° with respect to the longitudinal axis of the quill shaft 28 and the third layer 35 may have graphite or fiberglass fibers 350 aligned at 90' with respect to the longitudinal axis of the quill shaft 28.

In accordance with further embodiments, the third layer 35 may also be provided with overwrap portions 351, 352 proximate to the first and second longitudinal ends 282 and 283. These overwrap portions 351, 352 serve to increase a lamination effect and serve to decrease a risk of localized delamination of the composite wrap 30. In accordance with various embodiments, the overwrap portions 351, 352 may be formed of similar or different material as the third layer 35.

During operational conditions, as the quill shaft 28 is subject to excitation loading and vibrations (especially vibrations at or near multiples of the resonance frequency of the quill shaft 28), the composite wrap 30 serves to dampen such vibrations and to increase a weight of the quill shaft 28 as a whole. The dampening decreases an amplitude of the vibrations and thus prevents at least some wear that may ensue from un-damped vibrations while the increased weight of the quill shaft 28 serves to alter a resonance frequency thereof even when such increased weight is relatively small as a function of an original weight of the quill shaft 28. In accordance with embodiments, the composite wrap 30 described herein is curable over the quill shaft 28. As such, the composite wrap 30 may be tested and retested with varying formations during the formative (i.e., pre- and post-curing) processing of the composite wrap 30 to insure that the damping effects thereof are achieved for a given quill shaft 28.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A composite wrap for damping vibration in an elongated quill shaft having a cylindrical body, the composite wrap comprising:
   interior layering including a release coating for disposition about the cylindrical body;
   exterior layering configured to define an exterior composite wrap shape; and
   sequential cured-in-place, vibration damping, fibrous epoxy layers radially interposed between the interior layering and the exterior layering to dampen vibrations of and/or to adjust a resonance frequency of the cylindrical body, wherein the fibrous epoxy layer positioned adjacent the exterior layering includes overwrap portions proximate a first longitudinal end and a second longitudinal end of the composite wrap.

2. The composite wrap according to claim 1, wherein:
   the interior layering further comprises a rubber interface layer; and
   the exterior layering further comprises a tape wrap layer of varying fiber orientations and a nylon layer.

3. The composite wrap according to claim 1, wherein the sequential cured-in-place, vibration damping, fibrous epoxy layers comprise layers of fibers suspended within epoxy matrixes.

4. The composite wrap according to claim 3, wherein the layers of the fibers comprise layers of woven or unidirectional graphite, fiberglass, or aramid fibers suspended within the epoxy matrixes with varying fiber orientations.

5. The composite wrap according to claim 3, wherein:
   a first one of the layers of the fibers comprises fibers having first degree fiber orientations,
   a second one of the layers of the fibers comprises fibers having second degree fiber orientations, and
   a third one of the layers of the fibers comprises fibers having third degree fiber orientations,
   at least one of the first, second and third degree fiber orientations being unique from the others.

6. The composite wrap according to claim 5, wherein the third one of the layers of the fibers includes the overwrap portions.

7. A quill shaft, comprising:
   an elongate shaft member having a central portion and first and second opposite longitudinal ends; and
   a composite wrap, the composite wrap comprising:
   interior layering including a release coating for disposition about the central portion;
   exterior layering configured to define an exterior composite wrap shape; and
   sequential cured-in-place, vibration damping, fibrous epoxy layers radially interposed between the interior layers and the exterior layering to dampen quill shaft vibrations and/or to adjust a quill shaft resonance frequency, wherein the fibrous epoxy layer positioned adjacent the exterior layering includes overwrap portions proximate a first longitudinal end and a second longitudinal end of the composite wrap.

8. The quill shaft according to claim 7, wherein:
   the elongate shaft member comprises metallic material,
   the first longitudinal end comprises a first cylindrical body having a larger diameter than the central portion, a first curved interface and a splined distal end, and
   the second longitudinal end comprises a second cylindrical body having a larger diameter than the central portion, a second curved interface and a distal end.

9. The quill shaft according to claim 7, wherein,
   the first longitudinal end comprises a first cylindrical body having a larger diameter than the central portion, a first curved interface and a splined distal end, and
   the second longitudinal end comprises a second cylindrical body having a larger diameter than the central portion, a second curved interface and a distal end.

10. The quill shaft according to claim 9, wherein the composite wrap comprises:
    an interior surface to abut with an exterior surface of the central portion;
    curved axial surfaces to abut with respective exterior surfaces of the first and second curved interfaces; and
    an exterior surface coplanar with respective planes of exterior surfaces of the first and second cylindrical bodies.

11. The quill shaft according to claim 7, wherein:
    the interior layering further comprises a rubber interface layer; and
    the exterior layering further comprises a tape wrap layer of varying fiber orientations and a nylon layer.

12. The quill shaft according to claim 7, wherein the sequential cured-in-place, vibration damping fibrous epoxy layers comprise layers fibers suspended within epoxy matrixes.

13. The quill shaft according to claim 12, wherein the layers of the fibers comprise layers of woven or unidirectional graphite, fiberglass, aramid fibers suspended within the epoxy matrixes with varying fiber orientations.

14. The quill shaft according to claim 12, wherein:
    a first one of the layers of the fibers comprises fibers having first degree fiber orientations,
    a second one of the layers of the fibers comprises fibers having second degree fiber orientations, and
    a third one of the layers of the fibers comprises fibers having third degree fiber orientations,
    at least one of the first, second and third degree fiber orientations being unique from the others.

15. An aircraft comprising a first gear and a second gear connected by the quill shaft of claim 7 which transmits torsional energy between the first and second gears.

* * * * *